United States Patent
Zargarian et al.

(10) Patent No.: US 11,610,010 B2
(45) Date of Patent: *Mar. 21, 2023

(54) COMPUTING DEVICE COMPATIBLE ENCRYPTION AND DECRYPTION

(71) Applicant: Arebus, LLC, Santa Monica, CA (US)

(72) Inventors: Edwin Zargarian, Santa Monica, CA (US); Andrew Robert Rolfe, Deerfield, IL (US)

(73) Assignee: Arebus, LLC, Santa Monica, CA (US)

( * ) Notice: Subject to any disclaimer, the term of this patent is extended or adjusted under 35 U.S.C. 154(b) by 260 days.

This patent is subject to a terminal disclaimer.

(21) Appl. No.: 17/076,475

(22) Filed: Oct. 21, 2020

(65) Prior Publication Data

US 2021/0034770 A1    Feb. 4, 2021

Related U.S. Application Data

(63) Continuation of application No. 15/910,699, filed on Mar. 2, 2018, now Pat. No. 10,846,415.

(Continued)

(51) Int. Cl.
*G06F 21/00*     (2013.01)
*G06F 21/60*     (2013.01)
(Continued)

(52) U.S. Cl.
CPC ............ *G06F 21/606* (2013.01); *G06F 9/544* (2013.01); *G06F 21/6218* (2013.01); *H04L 63/0428* (2013.01); *G06F 3/0486* (2013.01)

(58) Field of Classification Search
None
See application file for complete search history.

(56) References Cited

U.S. PATENT DOCUMENTS

| | | | | |
|---|---|---|---|---|
| 7,380,120 B1* | 5/2008 | Garcia | ................... | H04L 63/20 |
| | | | | 713/168 |
| 8,065,713 B1* | 11/2011 | Vainstein | ............ | H04L 63/0428 |
| | | | | 713/168 |

(Continued)

OTHER PUBLICATIONS

Arora, Divya et al. Architectural Support for Run-Time Validation of Program Data Properties. IEEE Transactions on Very Large Scale Integration (VLSI) Systems, vol. 15, Issue: 5. https://ieeexplore.ieee.org/stamp/stamp.jsp?tp=&arnumber=4212136 (Year: 2007).*

(Continued)

*Primary Examiner* — Jeremiah L Avery
(74) *Attorney, Agent, or Firm* — Kilpatrick Townsend & Stockton LLP

(57) ABSTRACT

A method and apparatus encrypting data for use by an application includes receiving a first clear data in a security application running concurrently with the application. The security application encrypts the first clear data to generate a first encrypted package and distributes the encrypted package for use by the application or by other applications running concurrently with the application. The security application also receives and decrypts encrypted packages from the application or one of the other applications to provide clear data for use by the application. The security application may be implemented as a data entry utility that can be accessed directly by the application.

20 Claims, 15 Drawing Sheets

Related U.S. Application Data

(60) Provisional application No. 62/466,300, filed on Mar. 2, 2017.

(51) Int. Cl.
| | |
|---|---|
| *G06F 21/62* | (2013.01) |
| *G06F 9/54* | (2006.01) |
| *H04L 9/40* | (2022.01) |
| *G06F 3/0486* | (2013.01) |

(56) References Cited

U.S. PATENT DOCUMENTS

| | | | | |
|---|---|---|---|---|
| 10,360,545 | B2* | 7/2019 | Lee | G06F 21/6227 |
| 2002/0178370 | A1* | 11/2002 | Gurevich | G06F 21/606 |
| | | | | 713/184 |
| 2002/0199119 | A1* | 12/2002 | Dunnion | H04L 63/083 |
| | | | | 726/4 |
| 2005/0039034 | A1* | 2/2005 | Doyle | H04L 9/0825 |
| | | | | 713/193 |
| 2007/0011749 | A1* | 1/2007 | Allison | G06F 21/6218 |
| | | | | 713/165 |
| 2012/0222134 | A1* | 8/2012 | Orsini | G06F 21/62 |
| | | | | 726/28 |
| 2012/0290950 | A1* | 11/2012 | Rapaport | H04L 67/306 |
| | | | | 715/753 |
| 2014/0032691 | A1* | 1/2014 | Barton | H04L 51/08 |
| | | | | 709/206 |
| 2014/0033271 | A1* | 1/2014 | Barton | H04W 12/64 |
| | | | | 726/1 |
| 2014/0188946 | A1* | 7/2014 | Hartman | G06F 16/9024 |
| | | | | 707/805 |
| 2017/0090734 | A1* | 3/2017 | Fitzpatrick | G06F 3/0486 |

OTHER PUBLICATIONS

Blanc, M. et al. A Collaborative Approach for Access Control, Intrusion Detection and Security Testing. International Symposium on Collaborative Technologies and Systems (CTS'06). https://ieeexplore.ieee.org/stamp/stamp.jsp?tp=&arnumber=1644145 (Year: 2006).*

U.S. Appl. No. 15/910,699, filed Mar. 2, 2018, Computing Device Compatible Encryption and Decryption.

"U.S. Appl. No. 15/910,699, Non Final Office Action dated Mar. 19, 2020".

"U.S. Appl. No. 15/910,699, Notice of Allowance dated Jul. 21, 2020".

"U.S. Appl. No. 15/910,699, Response filed Jun. 18, 2020 to Non Final Office Action dated Mar. 19, 2020", 12 pgs.

Bhatt, Zalak, et al., "Advance security technique for format preserving encryption", [Accessed 2016] Retrieved from the internet: https://ieeexplore.ieee.org/stamp/stamp.jsp?tp=&arnumber=7823194, 2 pgs.

Raj, Gaurav, et al., "Enhancement of security mechanism for confidential data using AES-128, 192 and 256bit encryption in cloud", Accessed [2015] Retrieved from the Internet: https://ieeexplore.ieee.org/stamp/stamp.jsp?tp=&arnumber=7375144, 2 pgs.

* cited by examiner

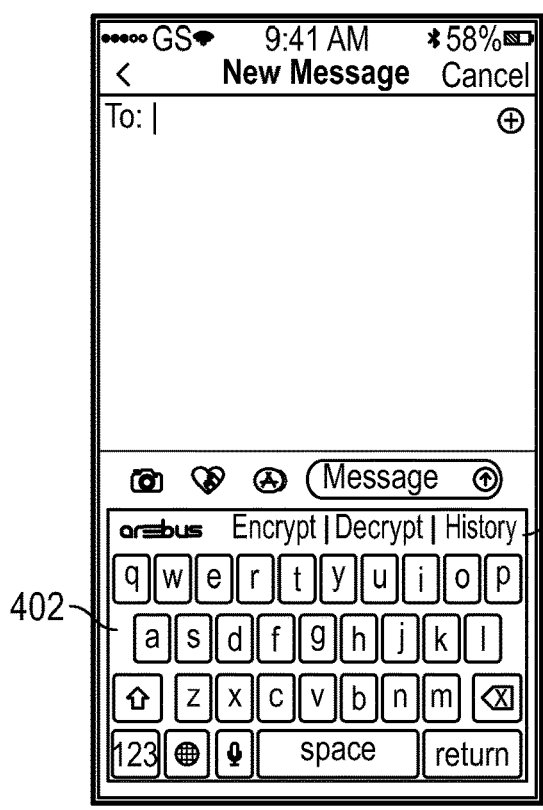 
FIG. 4A　　　　　　FIG. 4B
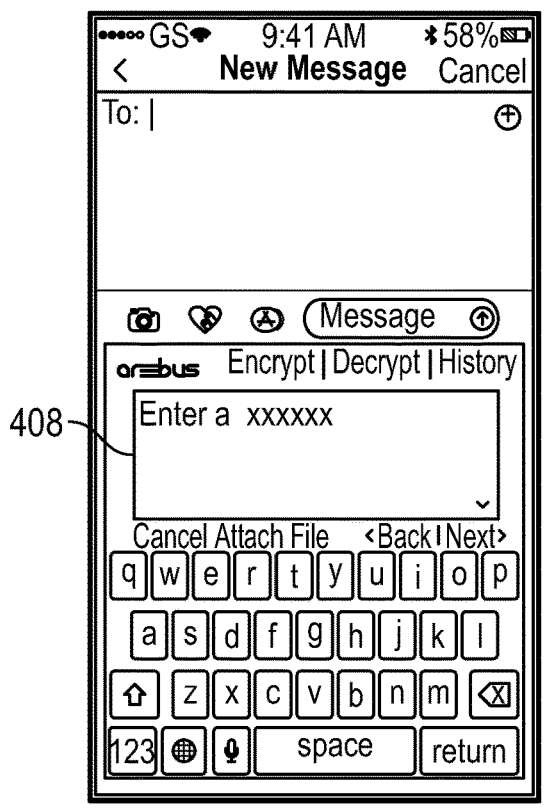 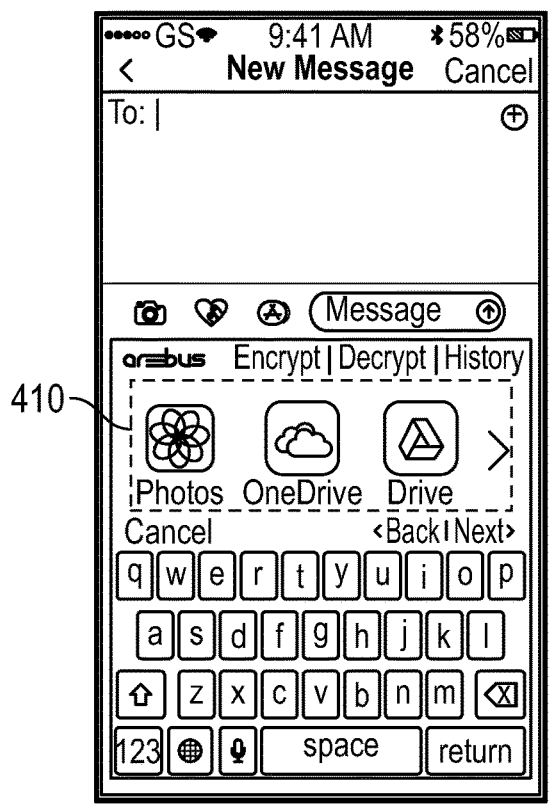
FIG.4C　　　　　　FIG. 4D

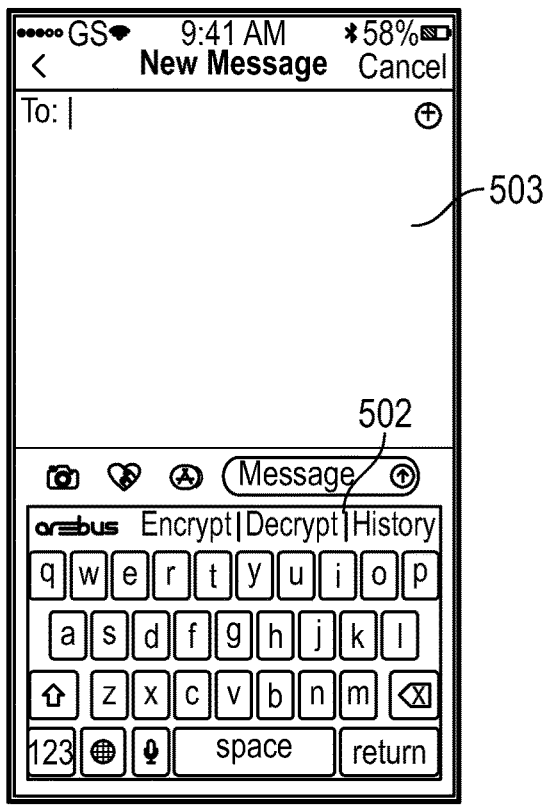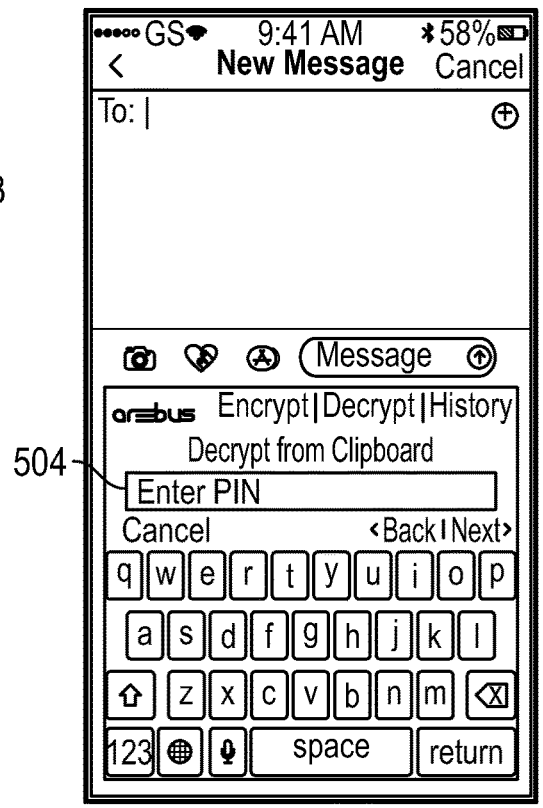
FIG. 5A  FIG. 5B
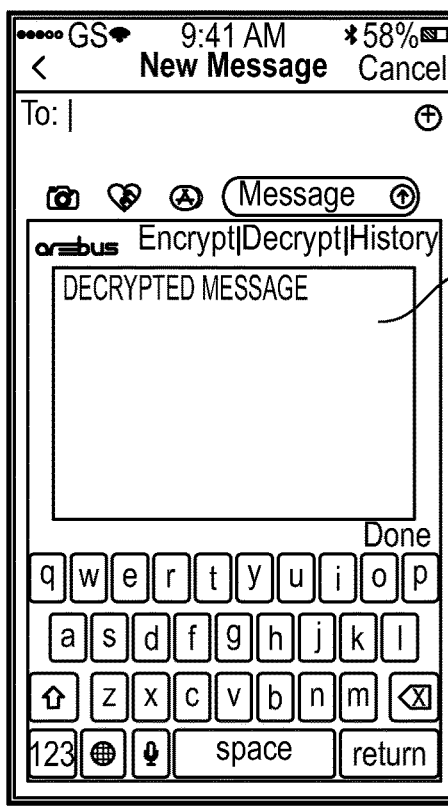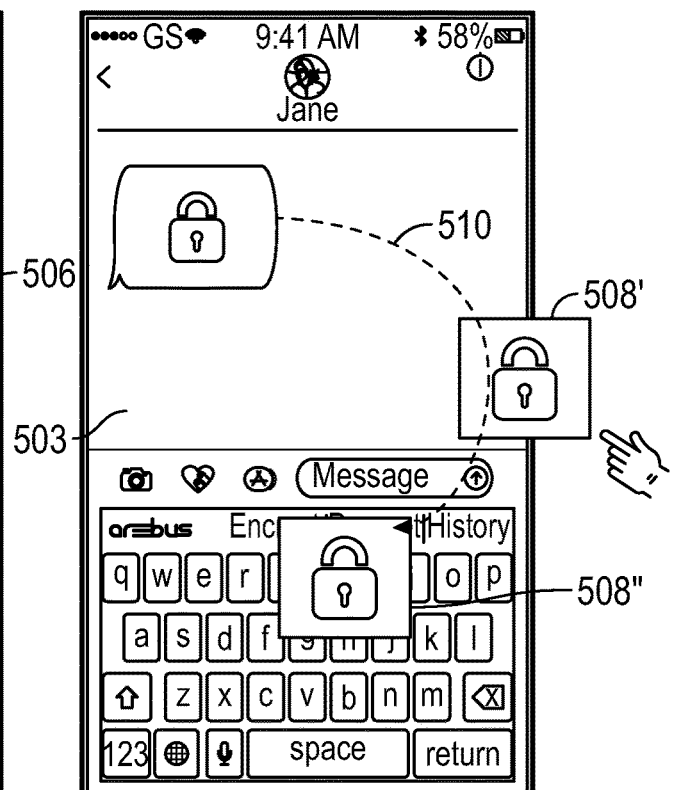
FIG. 5C  FIG. 5D

COMPUTING DEVICE COMPATIBLE ENCRYPTION AND DECRYPTION

CROSS REFERENCE TO RELATED APPLICATIONS

This application is a continuation of U.S. patent application Ser. No. 15/910,699, filed Mar. 2, 2018, which claims benefit of priority to U.S. Provisional Application No. 62/466,300, filed Mar. 2, 2017, the contents of such applications being incorporated by reference herein.

FIELD

The subject matter of the present application is a system, method and application for securing content, and more particularly, to a system, method and application for encrypting and decrypting data for use in a computing device such as a mobile device.

BACKGROUND

Currently available mobile platforms have few, if any, unified encryptions services that are compatible across different mobile, social media, and email applications. Typically, each application or service performs encryption and decryption independently of other applications and services. Furthermore, in many instances the user has little or no control over how the encrypted data is transmitted or stored.

The encryption and security services available today are fairly restrictive. Many such services use a dedicated standalone application to add privacy and/or security to their existing workflow, requiring the user to become familiar with a different process for each application/service on the mobile platform. This creates inconvenience and complexity, which decreases the chances that users will opt to employ these services. Not using the encryption services, however, puts users at risk of having their data compromised.

For example, a message inadvertently sent through a messaging application may be recalled only if the application contains a recall function. Further, even when a user deletes a message, that message may not be immediately deleted from the database of the messaging application.

Mobile platforms present a challenging environment for adding security to online and social services. In order to ensure privacy, a user may need to swap among applications to encrypt, send, post, and/or upload content security. For example, a user who wants to send a private message may need to switch from their commonly used applications to another secured application to format and send the encrypted message. The encrypted message will then be inaccessible from the commonly used applications.

SUMMARY

This summary is not an extensive overview of the claimed subject matter. It is intended to neither identify key elements of the claimed subject matter nor delineate the scope of the claimed subject matter. Its sole purpose is to present some concepts of the claimed subject matter in a simplified form as a prelude to the more detailed description that is presented later.

A method and apparatus encrypting data for use by an application includes receiving a first clear data in a security application running concurrently with the application. The security application encrypts the first clear data to generate a first encrypted package and distributes the encrypted package for use by the application or by other applications running concurrently with the application. The security application also receives and decrypts encrypted packages from the application or one of the other applications to provide clear data for use by the application.

According to one aspect, the security application may be implemented as a component of a data entry utility that can be directly accessed from the application.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description when considered in conjunction with the drawings.

BRIEF DESCRIPTION OF THE DRAWINGS

FIGS. 4A, 4B, 4C, 4D, 4E, 4F, 4G, 4H, and 4I are user interface diagrams useful for describing a second example encryption scenario;

FIGS. 5A, 5B, 5C and 5D are user interface diagrams useful for describing a first example decryption scenario;

DETAILED DESCRIPTION

Figure 1:
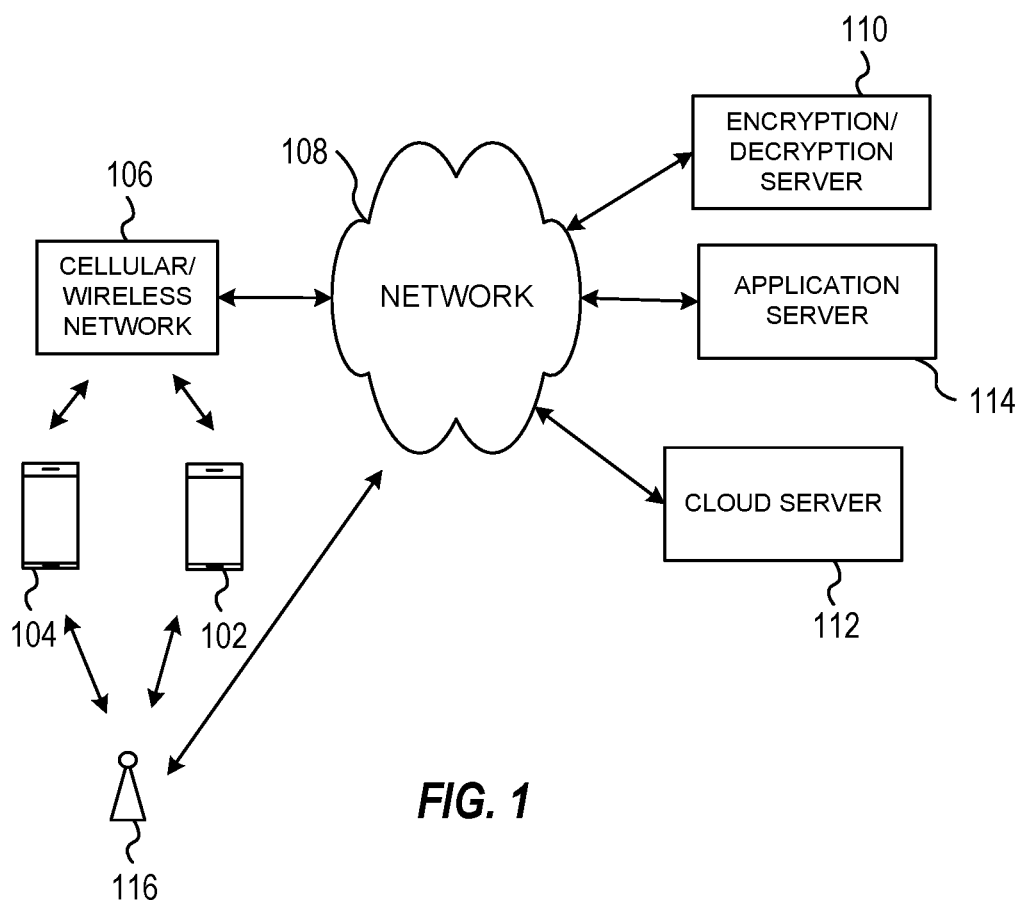
FIG. 1 is a block diagram showing an example network environment for the example systems and methods.

As a preliminary matter, some of the figures describe concepts in the context of one or more structural components, variously referred to as functionality, modules, features, elements, or the like. The various components shown in the figures can be implemented in any manner, such as software, hardware, firmware, or combinations thereof. In some cases, various components shown in the figures may reflect the use of corresponding components in an actual implementation. In other cases, any single component illustrated in the figures may be implemented by a number of actual components. The depiction of any two or more separate components in the figures may reflect different functions performed by a single actual component.

Other figures describe the concepts in flowchart or screenshot form. In this form, certain operations are described as being performed using distinct screens or blocks that are used in a certain order. Such implementations are exemplary and non-limiting. Certain blocks/screens described herein can be grouped together and performed in a single operation, certain blocks/screens can be broken apart into multiple component blocks or screens, and certain blocks/screens can be performed in an order that differs from that which is illustrated herein, including a parallel manner of implementing the blocks/screens. The blocks shown in the screenshots and flowcharts can be implemented using software, hardware, firmware, manual processing, or the like. As used herein, hardware may include microprocessors, digital signal processors (DSPs), microcontrollers, computer systems, discrete logic components, and/or custom logic components such as field programmable gate arrays (FPGAs), application specific integrated circuits (ASICs), programmable logic arrays (PLAs) or the like.

As to terminology, the phrase "configured to" encompasses any way that any kind of functionality can be constructed to perform an identified operation. The functionality can be configured to perform an operation using, for example, software, hardware, firmware, or the like. For example, the phrase "configured to" can refer to a logic circuit structure of a hardware element that is arranged to implement the associated functionality. The phrase "configured to" can also refer to a logic circuit structure of a hardware element that is arranged to implement the coding design of associated functionality of firmware or software. The term "module" refers to a structural element that can be implemented using any suitable hardware (e.g., a processor, among others), software (e.g., an application, among others), firmware, and/or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system. The term "application" may refer to an application running locally on the device, a remote application accessible through a network or a web application accessible through a browser application on the mobile device.

Although the examples described below show one or more applications running on a mobile device, it is contemplated that the subject matter of this application may be implemented on stationary computing devices such as, without limitation, desktop computers, virtual machine computing environments, or computing workstations.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any non-transitory computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

The embodiments described below are for a security system in which users can encrypt and decrypt data independently of the application used, through the use of a mobile security application. The security application may be implemented as an application configured to run concurrently with other applications on the computing device. Concurrent running may be implemented by a user starting both the security and the other application via multitasking. Alternatively or in addition, running the security application concurrently with the other applications may involve the other applications accessing the security application directly. In particular, the security application may be implemented as a security soft keyboard which may replace or augment a soft keyboard utility of the mobile device. Thus, in the materials below, references to the "security application" also cover the soft keyboard utility or augmented soft keyboard utility. In some embodiments, the mobile security application allows users to encrypt/decrypt text entered using the soft keyboard and/or data or files available on their devices from other applications or in cloud storage. When the security application is implemented as a soft keyboard, the user may enter encryption or decryption commands using keys on the keyboard. The users can package the encrypted data into file formats compatible with existing third party applications/services and can control who is allowed decrypt the encrypted content. The encrypted data may be distributed to other users via the third party application/service. Once the recipient receives the encrypted data through the third party application/service, the recipient can decrypt the data using the example security application, which can also authenticate the encrypted data.

Implementing the security application as a soft keyboard that replaces or augments a soft keyboard utility on the mobile device may be particularly advantageous because the soft keyboard may be invoked from many applications that run on the mobile device. Using such a keyboard, a user may encrypt and/or decrypt data from the application without having to open a separate security application. Alternatively, the security application as an application that is open concurrently with another application on the mobile device via multitasking.

The following examples describe workflows and user interfaces for encrypting and sending encrypted data packages and for receiving and decrypting the data packages using example systems.

FIG. 1 is a block diagram showing an example network environment for the example systems and methods. In the example shown in FIG. 1, a user of a first mobile device 102 wants to exchange encrypted data to a user of a second mobile device 104 through a cellular wireless network 106, for example, via a messaging application, an e-mail application and/or a social media application. Alternatively, the mobile devices 102 and 104 may be configured to exchange encrypted data using similar applications via a wireless network, for example a Wi-Fi network 116 operating according to one or more of the IEEE 802.11 or IEEE 802.15 standards. Both the cellular wireless network 106 and the Wi-Fi network 116 may be coupled to an encryption/decryption server 110 and to one or more application servers 114 via a wide area network (e.g. the Internet) 108. As described below, in addition to exchanging encrypted data with other users, a user may want to encrypt data, for example, personal photographs, for storage on a cloud server 112 which is also accessible via the network 108.

Figure 2:
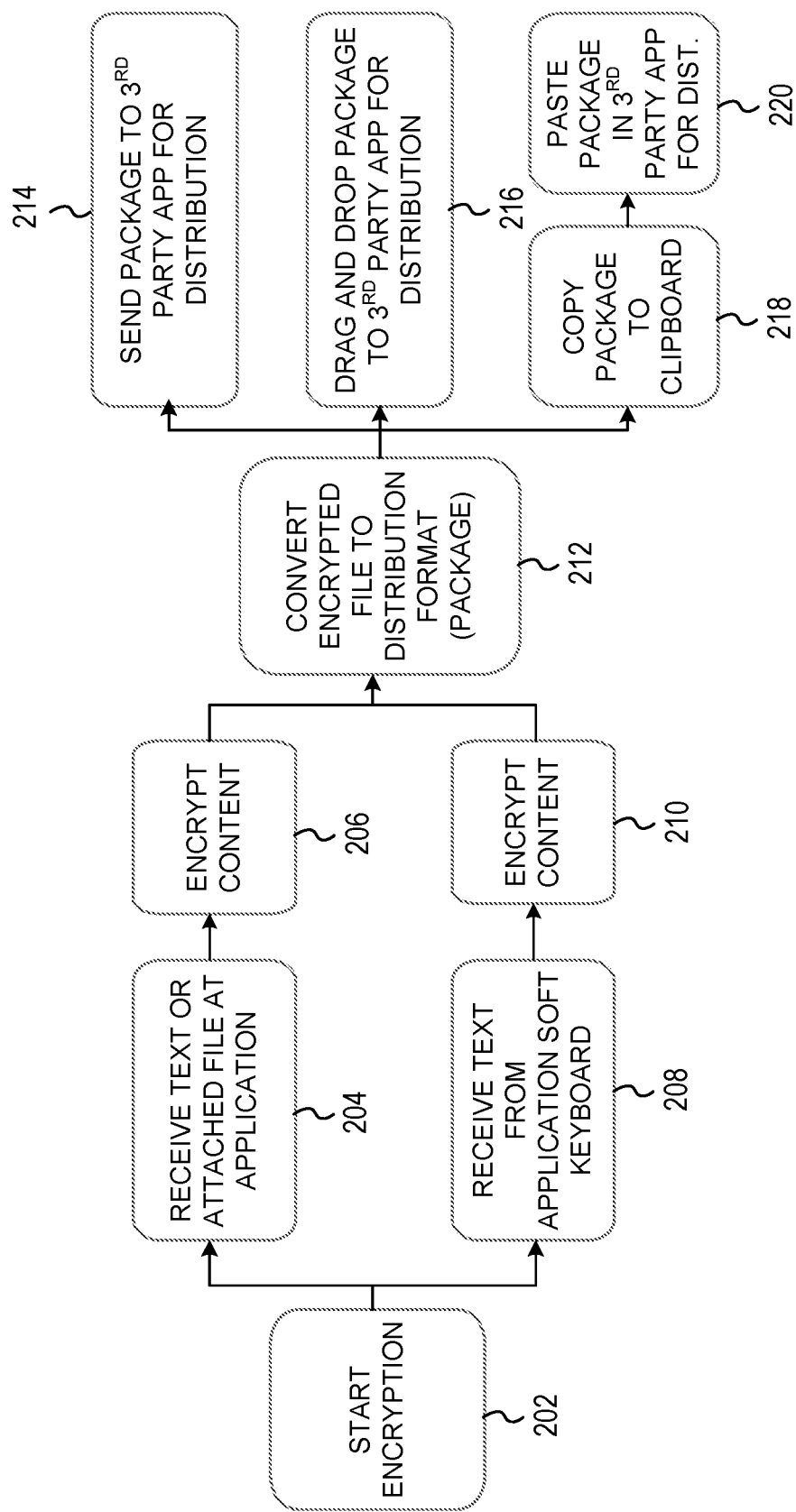
FIG. 2 is a flow chart showing several alternative encryption scenarios.

FIG. 2 is a flow chart showing several alternative encryption and distribution scenarios that may be implemented using the example embodiments described below with reference to FIGS. 3A-3K and 4A-4I. In all of these scenarios, the user starts the encryption process at block 202 by running an example security application to generate the encrypted data.

In a first scenario, the application accesses text or an attached file on the mobile device at block 204. For example, the security application may have access, through a file sharing utility, through a file management utility, or through one or more application program interfaces (APIs) of one or more other applications running on the mobile device, to a text file, a photograph and/or a media or other type of file stored on or available to the mobile device. The user may also enter text or other data directly into the application, using available data entry utilities such as a voice-to-text utility, a handwriting recognition utility or a soft keyboard utility. Any of these utilities may be modified to process encryption and decryption commands, to authenticate users and to set access restrictions on the encrypted data and, thus, may be used as security applications. Block 206 may encrypt the directly entered text, encrypt text extracted from the file for encryption, or may encrypt the entire file. At block 212, the application converts the encrypted file to a distribution format, referred to herein as a "package," "data package," or "encrypted package." As described below, the encrypted package may then be distributed in at least three different ways. As shown in block 214, the user may instruct the security application to send the package directly to a third party application for distribution (e.g. via the API of the third party application, via a file sharing utility of the mobile device operating system or via a file management utility of the mobile device operating system). Alternatively, as shown in Block 216, the user may drag and drop the package into the third party application for distribution. As another alternative, the user may cause the security application to copy the encrypted package to the clipboard of the mobile device and then, after running the third party application, paste the encrypted package from the clipboard into the third party application. Many mobile devices employ temporary clipboard data buffer which are used for temporary data storage and/or for transferring data among applications. The clipboard buffer may be accessed, for example, using an operation system interface on the mobile device.

In a second scenario, the security application may receive text data entered by the user using a security soft keyboard of the security application as shown at block 208. The security soft keyboard may replace or augment a soft keyboard that is available for use by the applications running on the mobile device. As described below, In this scenario, the entered text may be encrypted in block 210 and distributed, as set forth above with respect to the description of blocks 212, 214, 216, 218 and 220.

The example scenarios all encrypt text, media data (e.g. pictures, videos or audio files), or other data into an encrypted package and provide the encrypted package to the security application for distribution to one or more third party applications. In the materials that follow, the data prior to encryption is referred to as "clear data" to distinguish it from the encrypted data. The clear data may be encrypted using an encryption engine operating according to one or more of a number of encryption algorithms such as symmetric key cryptographic algorithms (e.g. advanced encryption standard (AES), data encryption standard (DES), triple-DES etc.) and/or asymmetric algorithms such as public key cryptographic algorithms (e.g. Rivest-Shamir-Adleman (RSA) or digital signature services (DSS)) or other encryption algorithms such as Diffie-Hellman and Elliptic Key or a one-time pad algorithm. It is contemplated that multiple encryption algorithms may be combined. For example, a symmetric key used for a symmetric encryption algorithm may asymmetrically encrypted and retrieved by a user or exchanged among users using the asymmetric algorithm.

When an asymmetric algorithm is used, the system 100, shown in FIG. 1, may also include a key server (not shown) through which the users may obtain public keys used to encrypt and decrypt data.

The third-party application to which the encrypted package is distributed may be, for example, a social media application, a cloud storage application, an e-mail application, a messaging application or other application that uses text or media files. The encrypted package may be accessed by the third party application in the same way that text or media files are accessed. As described below with reference to FIGS. 4A through 7C, the encrypted package may be decrypted using the example security application, which may be implemented as a security soft keyboard, and then processed as clear data by the third party application. For example, a user may encrypt a personal document for secure storage on a cloud server. Alternately, a user may encrypt media data such as a personal photograph and/or short video clip and share the encrypted package with trusted users via an email or social media application.

The examples below describe the security application, including the security soft keyboard, used in a messaging application to encrypted content to be added to a message and/or to decrypt encrypted content from a message. It is contemplated that the security application and/or security soft keyboard may be used to encrypt/decrypt content for other types of applications, for example, cloud storage applications, social media applications, or any other type of application that may communicate or store data.

Figure 3A:
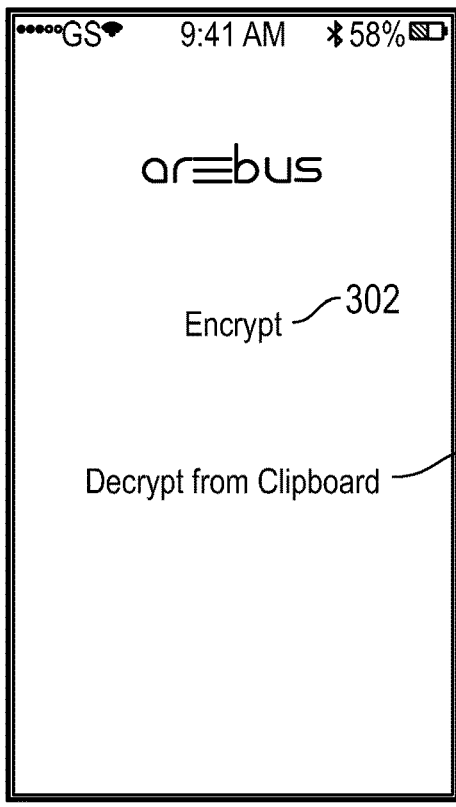
FIGS. 3A, 3B, 3C, 3D, 3E, 3F, 3G, 3H, 3I, 3J, and 3K are user interface diagrams useful for describing a first example encryption scenario.
Figure 3B:
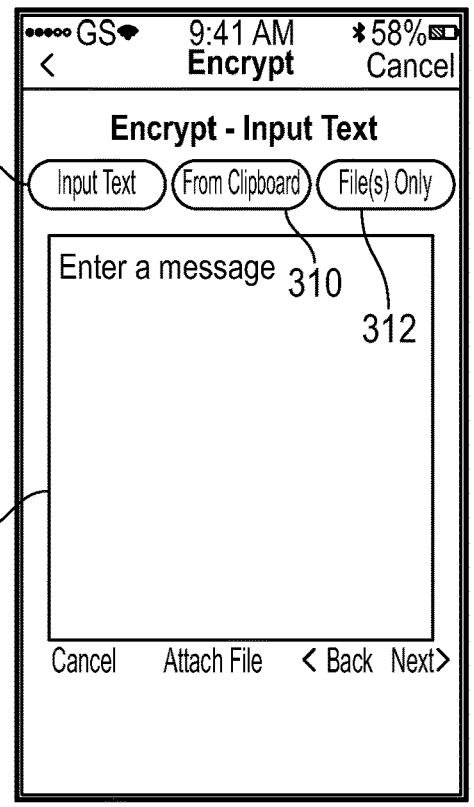

FIGS. 3A, 3B, 3C, 3D, 3E, 3F, 3G, 3H, 3I, 3J, and 3K are user interface diagrams useful for describing a first example encryption scenario. To begin the encryption process, the user first opens the security application as shown in FIG. 3A. The security application includes two options, "Encrypt" 302 and "Decryption from Clipboard" 304. In this example, the user selected the Encrypt option 302. FIG. 3B shows an example screen that may be displayed in response to the selection of the Encrypt option. The screen in FIG. 3B includes three soft buttons, an Input Text button 306, a Copy from Clipboard button 310, and a File Attachment button 312. In the example shown in FIG. 3B, the user has selected the Input Text button so the screen displays a text box 308 in which the user may enter text by any means available on the mobile device. For example if the mobile device has a handwriting recognition function the user may write the message in the box 308 using a fingertip or stylus. Alternatively, the user may tap the text box 308 to activate a soft keyboard (not shown) and use the soft keyboard to enter text into the text box 308. The entered text becomes the clear data for the security application.

Figure 3C:
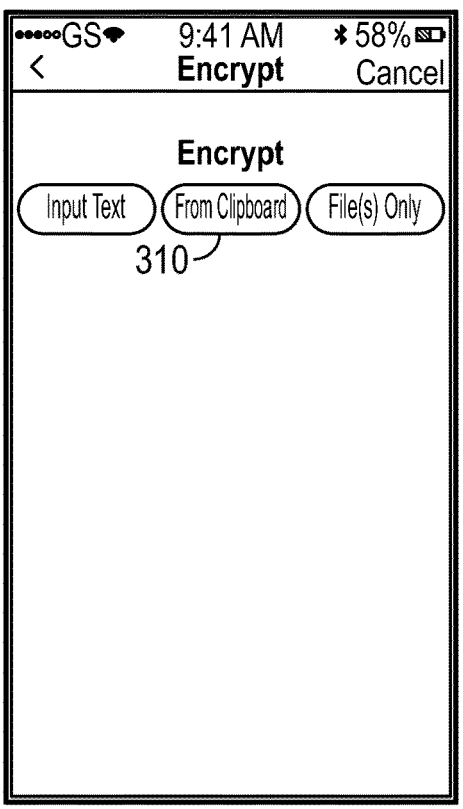

FIG. 3C shows a screen that allows a user to encrypt content from a clipboard. The user may make this selection by pressing the "From Clipboard" button 310. In this instance text or files are pulled from clipboard (e.g. text or files that were cut/copied from another application) as the clear data for the security application.

Figure 3D:
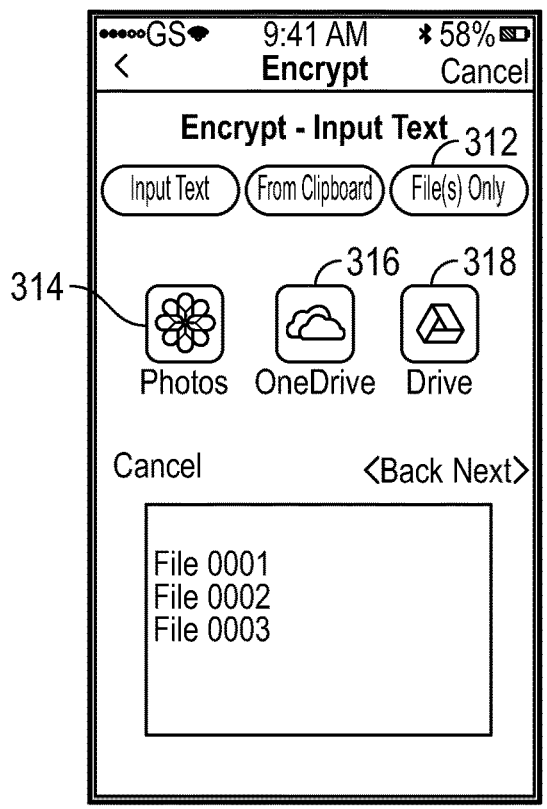

FIG. 3D shows a screen that may be displayed by the security application when the user activates the File Attachment soft button 312. In the example shown in FIG. 3D, the user can choose from either local storage, such as the photos 314, or other local file storage application (not shown) or from a cloud service (e.g. OneDrive® 316, Google Drive® 318, or other cloud storage application). In this instance, the file retrieved by the security application is the clear data. Using one of the cloud file options 316 or 318, a user may download a file from a cloud service by selecting the file from a display box 319, encrypt the file, upload the encrypted file back to the cloud, and then send a link to cloud storage location for the encrypted to another user. After step 3D, the security application may encrypt the clear data to generate the encryption package.

Figure 3E:
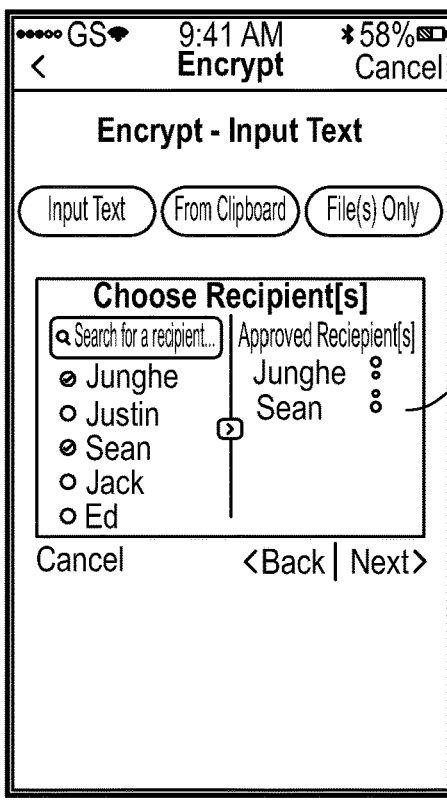
Figure 3F:
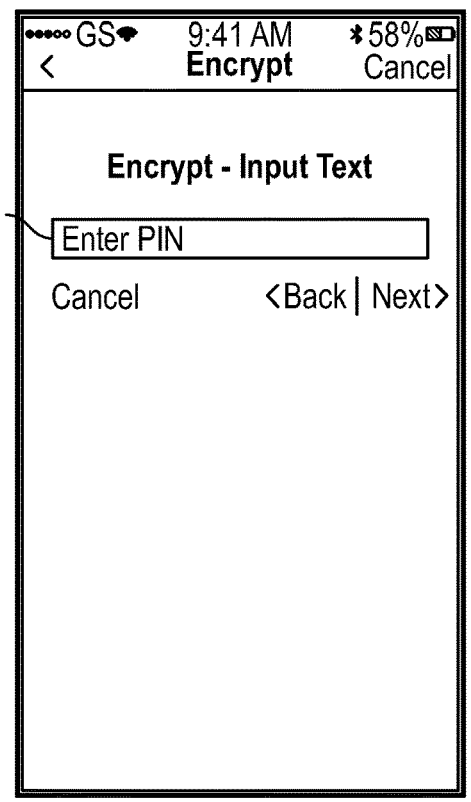

After generating the encryption package, the user can limit who is able to access the package as shown in FIG. 3E, by choosing permitted users, for example, from a contact list 322. As shown in FIG. 3F, the security application may ask the user to authenticate themselves for example by entering a password or pin code in box 324, providing biometric data, or by performing some other authentication method. In this step, a user may also specify restrictions for the encrypted file, for example, an expiration date expiration and/or restrictions on the user of the third-party application such as the ability to save or print the decrypted data.

Figure 3G:
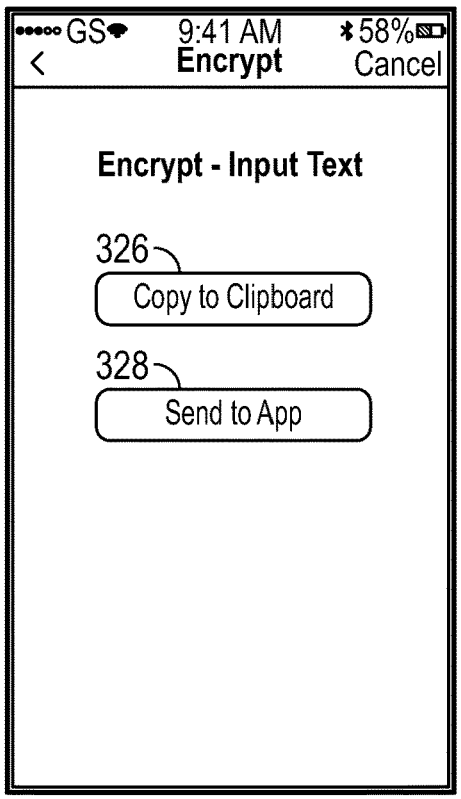
Figure 3H:
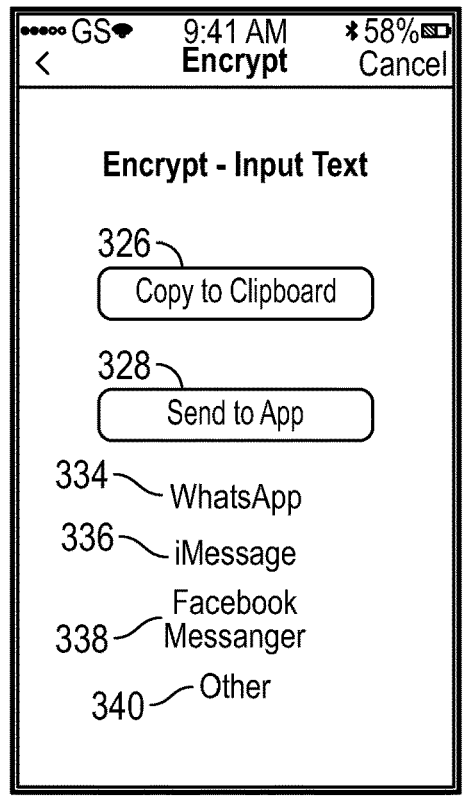

As shown in FIG. 3G, the user of the security application may select how the encryption package is to be processed by the application for distribution. In the example shown in FIG. 3G, the user has two options: Copy to Clipboard (soft button 326) which causes the security application to copy the encryption package to the clipboard, or to Send to App (soft button 328) to send the encryption package to a third-party application directly, for example via an API or through the mobile device operating system. When the user selects soft button 326, the encryption program places the encrypted package into the clipboard buffer of the mobile device. As shown in FIG. 3H, when the user selects the Send to App soft button 328, the security application displays a list of applications to which the package may be sent. The example shown in FIG. 3H, these applications include WhatsApp® 334, iMessage® 336, Facebook Messenger® 338, and Other 340. The specifically listed applications may use an API to distribute the encryption package. Selecting Other may, for example, cause the security application to display a list of all applications available to the mobile device to allow the user to select one of those applications through the operating system.

Figure 3I:
Figure 3J:
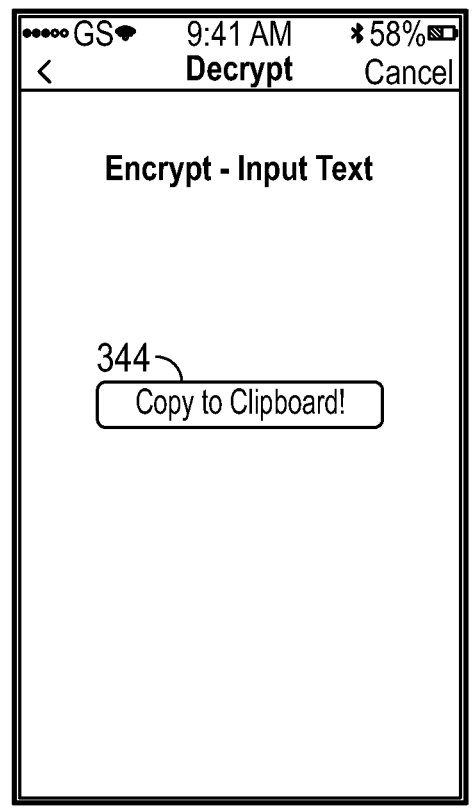
Figure 3K:
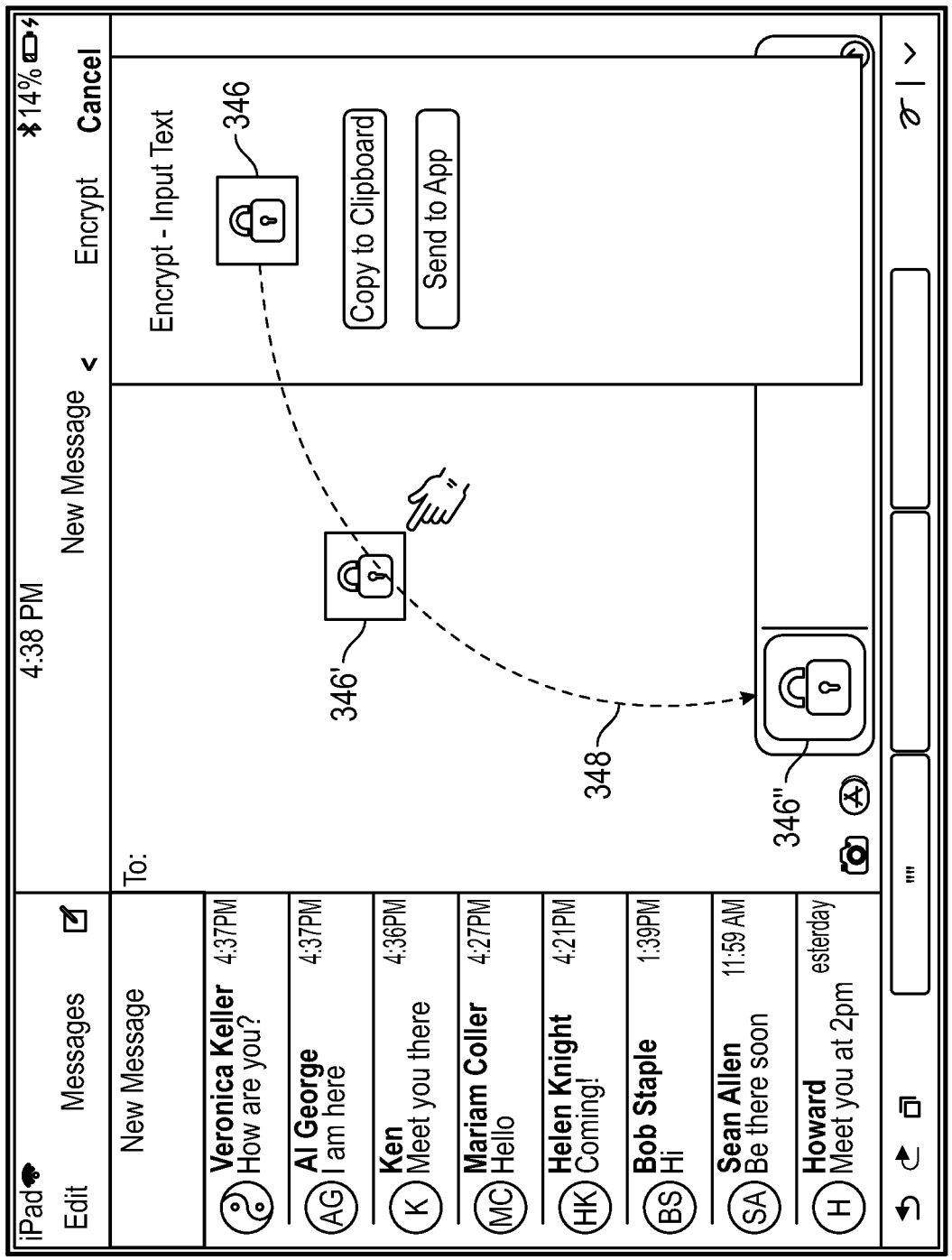

FIGS. 3I and 3J show the result of pressing the soft button 326 after pressing the button as shown in FIG. 3I, the security application confirms that the encrypted package has been copied to the clipboard as shown by the message 344 in FIG. 3J. Following the display of the message as shown in FIG. 3J, the user may open another application on the mobile device and paste the encrypted package into the other application from the clipboard. Alternatively, as shown in FIG. 3K, the user may drag the encrypted package 346 along the arc 348 as indicated by the encrypted package 346' into the third-party application, in this example, the messaging application, to attach the encrypted package 346" to the message.

Figure 4E:
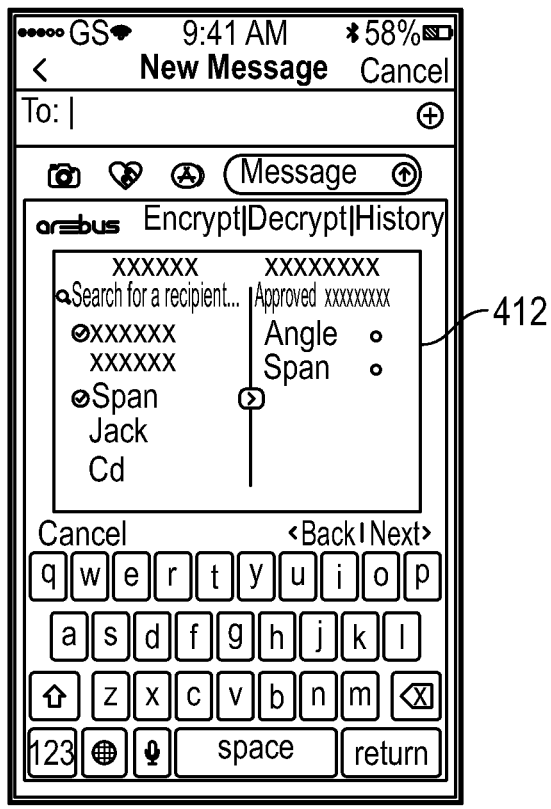

FIGS. 4A, 4B, 4C, 4D, 4E, 4F, 4G, 4H, and 4I are user interface diagrams useful for describing a second example encryption method. In this example, a user of the messaging application opens a soft keyboard 402 of the security application, which is referred to herein as the security soft keyboard. This soft keyboard may, for example, replace the soft keyboard of the mobile device or be selected from the messaging application, for example, as one of the option settings. The example soft keyboard 402 may perform some or all of the functions of the security application. As shown in FIG. 4A, the security keyboard may include a toolbar 404 that allows a user to select Encrypt, Decrypt or History. Selecting Encrypt allows a user to generate an encrypted package, selecting Decrypt allows the user to decrypt an encrypted package and selecting History allows the user to obtain an historical list of previously encrypted or decrypted packages and change the previously granted permissions including revoking permissions from previously encoded packages. The keyboard shown in FIG. 4A is only one example configuration. Alternatively, the toolbar 404 may be displayed above the standard soft keyboard of the mobile device or adjacent to a soft keyboard provided by the manufacturer or distributor of the mobile device or by a third party to implement the security application. In another alternative, the Encrypt, Decrypt, and/or History functions may be activated in other ways, for example by adding keys to the soft keyboard of the mobile device.

When the user selects the Encrypt function in the screen shown in FIG. 4A, the security application, as shown in FIG. 4B, may display three soft buttons, "Input Text," "From Clipboard," and "File(s) Only" as shown in dashed line box 406. These buttons have the same function as the soft buttons 306, 310, and 312 described above. The buttons in dashed line box 406 allow a user to enter text directly, copy text or other clear data from the clipboard or receive the clear data from one or more files. When, for example, the user selects "Enter Text," and begins to type on the soft keyboard 402, the mobile device displays the text being typed in a text box 408, as shown in FIG. 4C. The user may also select a file for encryption by activating the "select file" button below the text box 408. In this instance, file selection will proceed as described below with reference to FIG. 4D.

FIG. 4D shows the response of the security application to selecting the "File(s) Only" button in box 406. In particular security soft keyboard may display, in block 410, a set of target applications including a photo application and two cloud storage applications. After a particular application is selected, files available to that application may be displayed in the window 410 in place of the listed applications, allowing the user to choose one or more files from the files available to the particular application using an API for that application. As indicated by the arrow at the right side of block 410 the user may access other applications from which the clear data file to be encrypted. The files available to these applications may be accessed through the operating system as described above with reference to FIG. 3H.

Figure 4F:
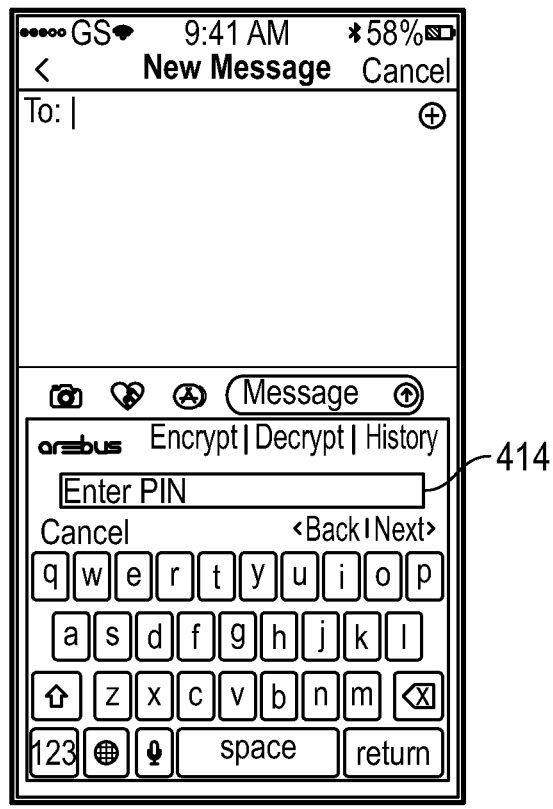
Figure 4G:
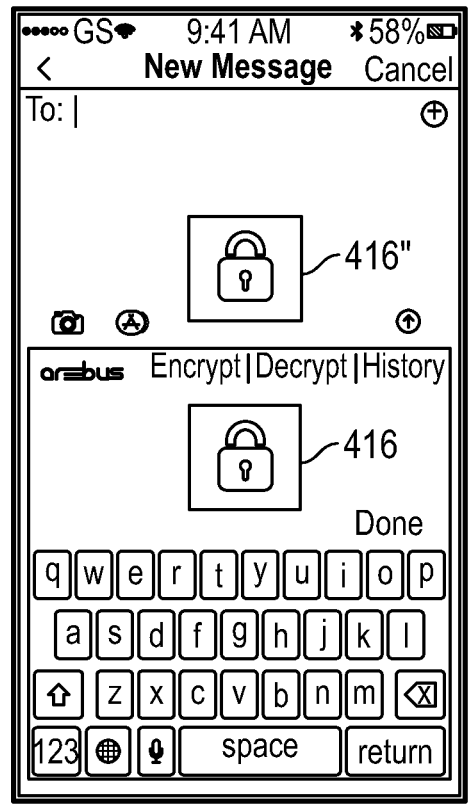

After the clear data has been entered or selected, the security application allows the user to select one or more recipients and set the permissions for each recipient as shown by block 412 of FIG. 4E and as described above with reference to FIG. 3E. In FIG. 4F, the user enters the authentication data. When the recipient of the message has been entered and the user authenticated, the security application may transfer the encrypted package 416 directly to the messaging application as shown in FIG. 4G by the transferred message 416'.

Figure 4H:
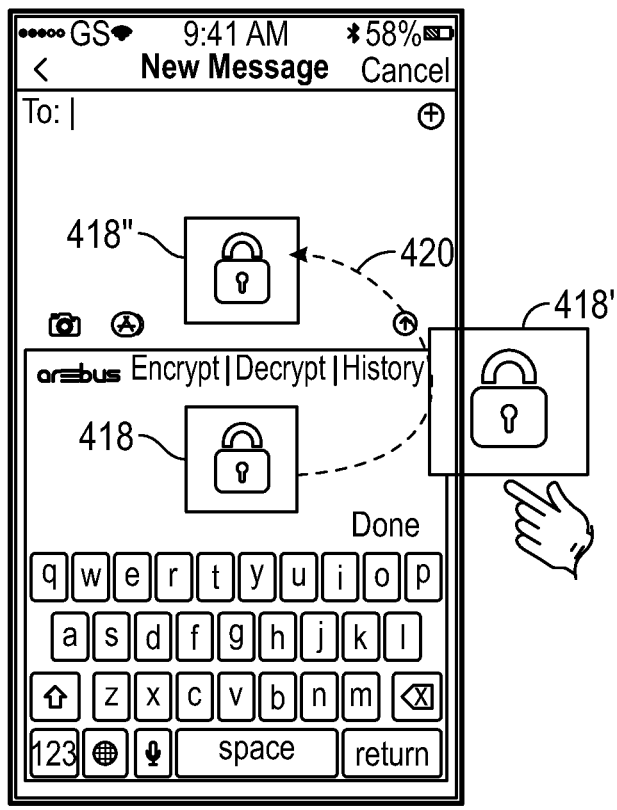
Figure 4I:

Alternatively, as shown in FIG. 4H, the user may drag and drop the encrypted package 418 from the security application to the messaging application along curve 420 as shown by the intermediate and final security applications 418' and 418". FIG. 4I illustrates another delivery message in which the security application automatically copies the encrypted package to the clipboard and displays a message 420 indicating that the package has been copied. The user can then paste the encrypted package into the messaging application and/or into another application.

The examples described above concern the generation and distribution of an encrypted package. The examples described below, with reference to FIGS. 5A through 7C describe how an encrypted package is decrypted and how the encrypted contents are displayed. All of these examples assume that the encrypted package is available in the security application either by the encryption package being copied from the clipboard, pulled directly from the messaging application, or by dragging and dropping the encryption package from the messaging application to the security keyboard or security application (described below with reference to FIGS. 7A-7C). FIGS. 5A, 5B, 5C and 5D are user interface diagrams useful for describing a first example decryption method in which the recipient of encrypted package shares the package with the security application in order to decrypt the package to obtain the clear data.

As shown in FIG. 5A, the user opens the third-party application which displays either the security soft keyboard, the standard keyboard with the security application toolbar 502 or a custom soft keyboard with dedicated keys for performing the encryption, decryption and history functions. The keyboard and/or toolbar 502 may be displayed in response to the user selecting an encrypted package (not shown) from the message area 503 of the example messaging application. Alternatively, the user may copy the encrypted package to the clipboard and when the user selects the decrypt button the keyboard pulls the encrypted package from the clipboard.

Next, as shown in FIG. 5B, the user of the messaging application authenticates their use of the security application for example by entering a password or pin code, or by performing biometric authentication. Once the user is authenticated, the encryption package is decrypted and displayed in block 506 as shown in FIG. 5C. As an alternative to selecting the encrypted package from the message 503 to invoke the security application/soft keyboard, a user may drag and drop the encryption package 508 along the arc 510 from the message area 503 to the security application/soft keyboard as shown by the intermediate and final encrypted packages 508' and 508". After the operation shown in FIG. 5D the decrypted content may be displayed as shown in FIG. 5C.

Figure 6A:
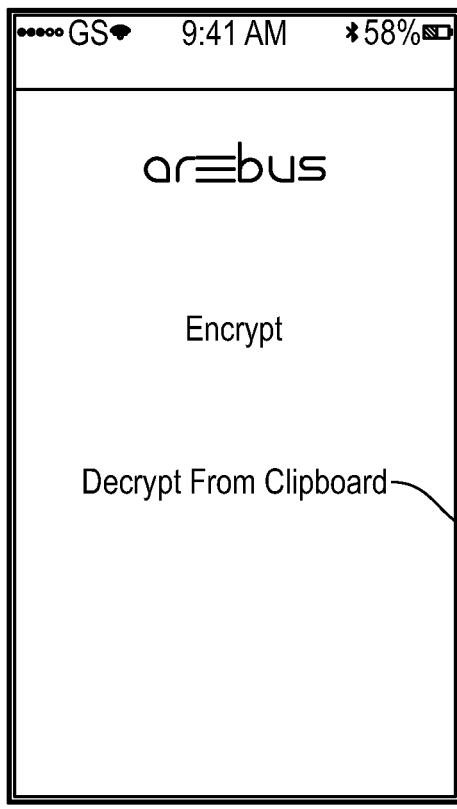
FIGS. 6A, 6B and 6C are user interface diagrams useful for describing a second example decryption scenario.
Figure 6B:
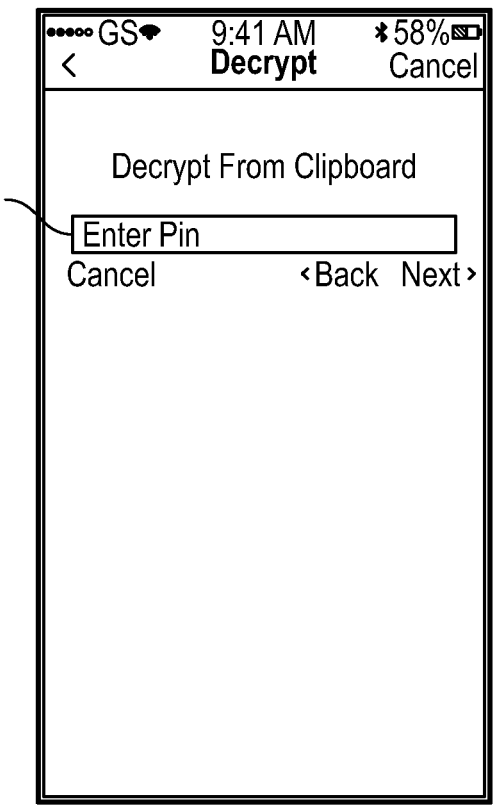
Figure 6C:
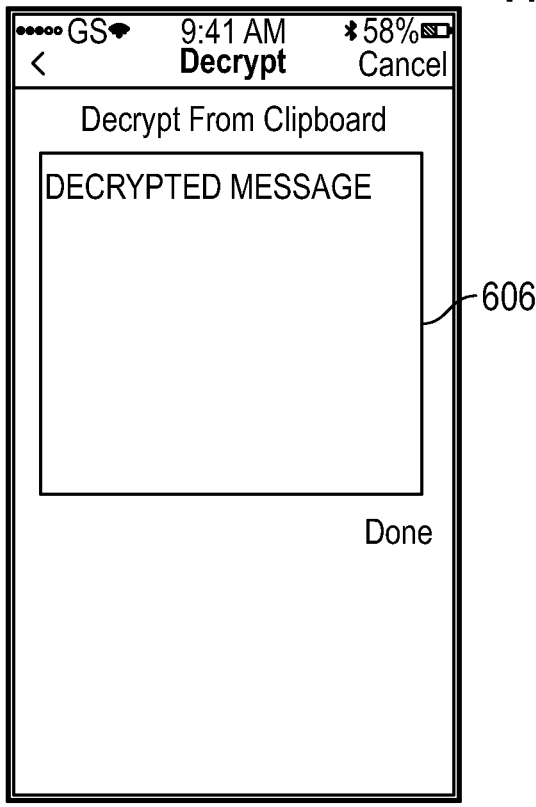

FIGS. 6A, 6B and 6C are user interface diagrams useful for describing a second example decryption method. In this method, the mobile device displays the opening screen of the security application as shown in FIG. 6A. This is the same screen as shown in FIG. 3A. In this instance, however, the user commands the security application to Decrypt from Clipboard 602. The security application, as shown in FIG. 6B, then requests authentication 604 as described above with reference to FIGS. 4F and 5B, and when the user has been authenticated, the application displays the decrypted clear data 606 as shown in FIG. 6C.

Figure 7A:
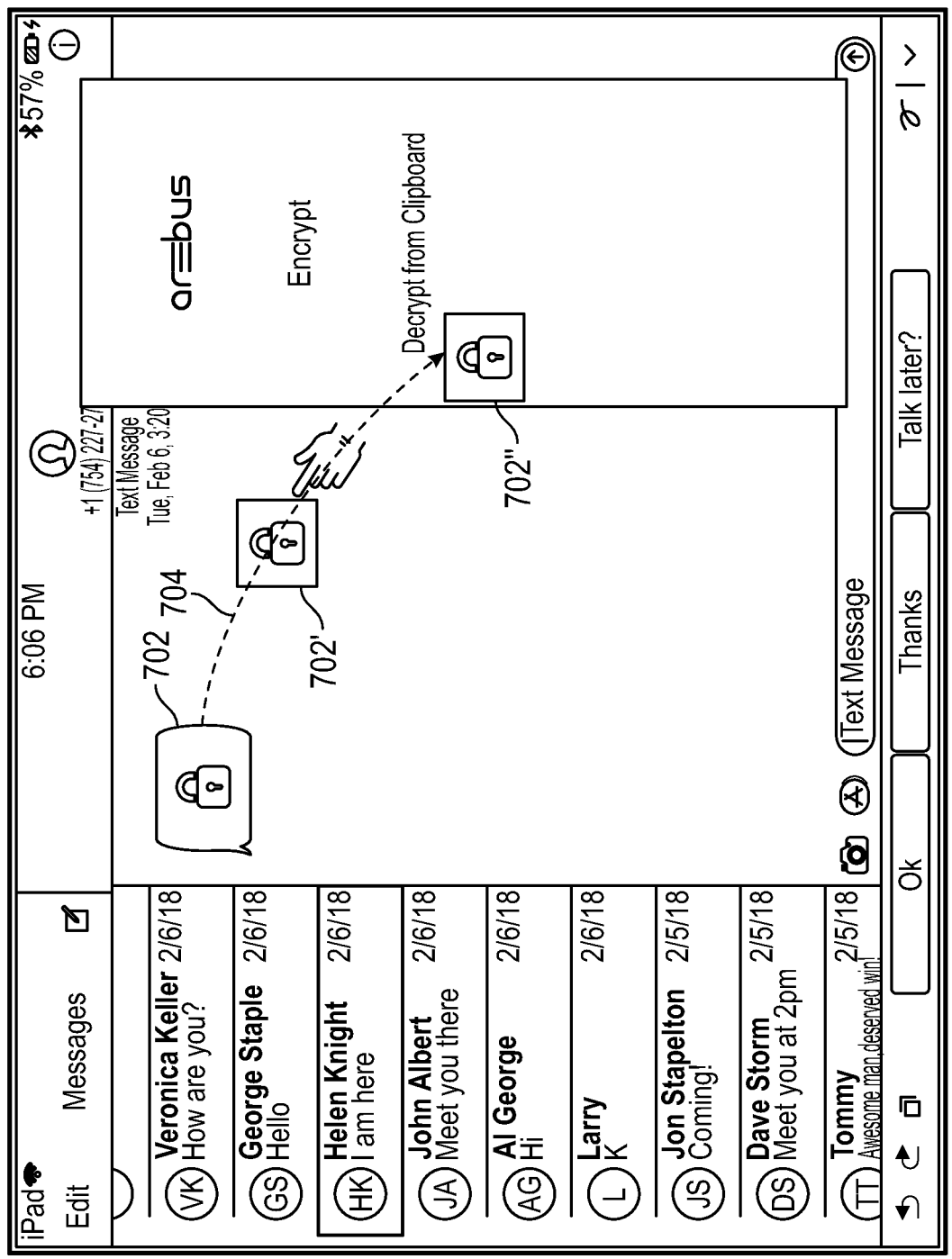
FIGS. 7A, 7B and 7C are user interface diagrams useful for describing a third example decryption scenario.
Figure 7B:
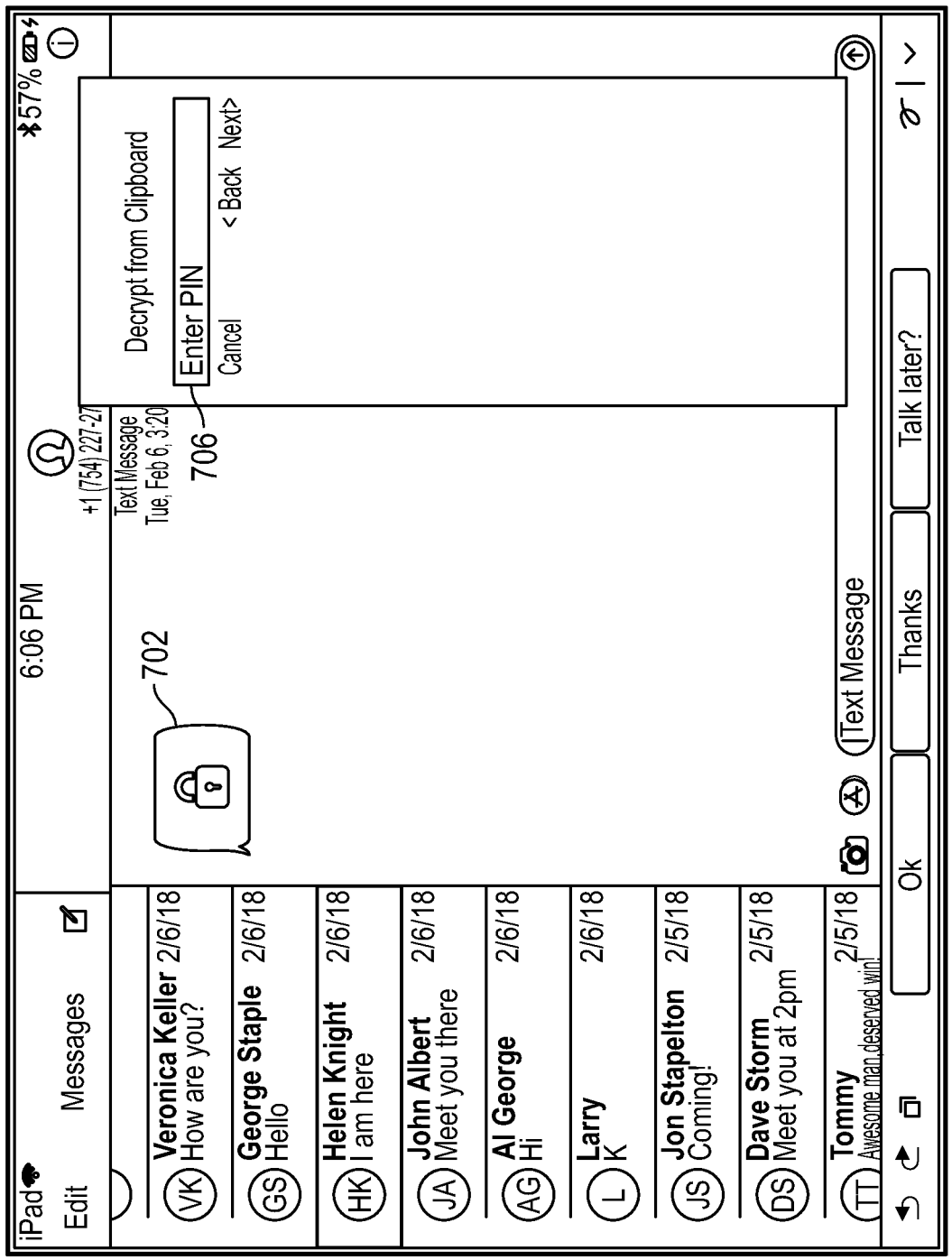
Figure 7C:
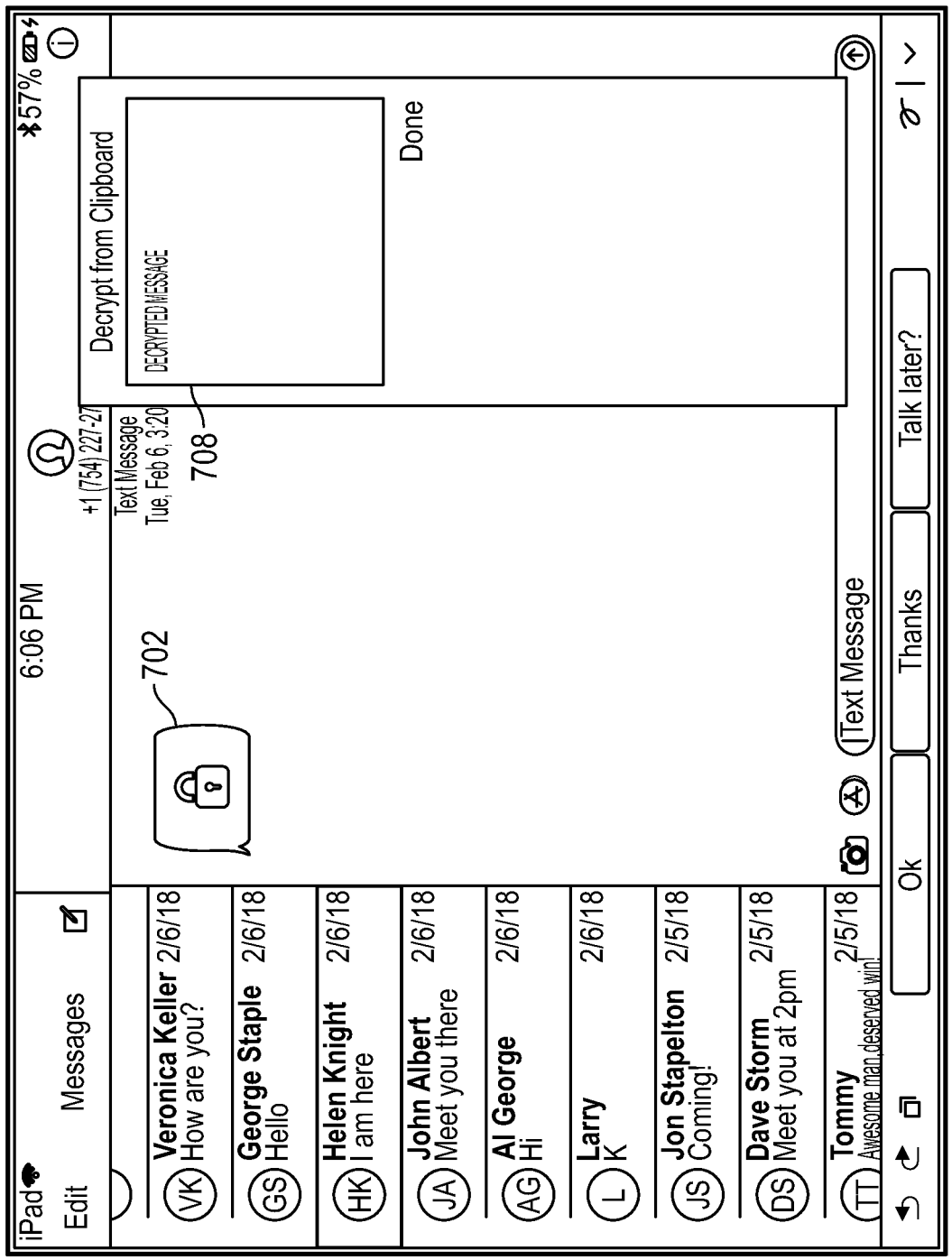
Figure 8:
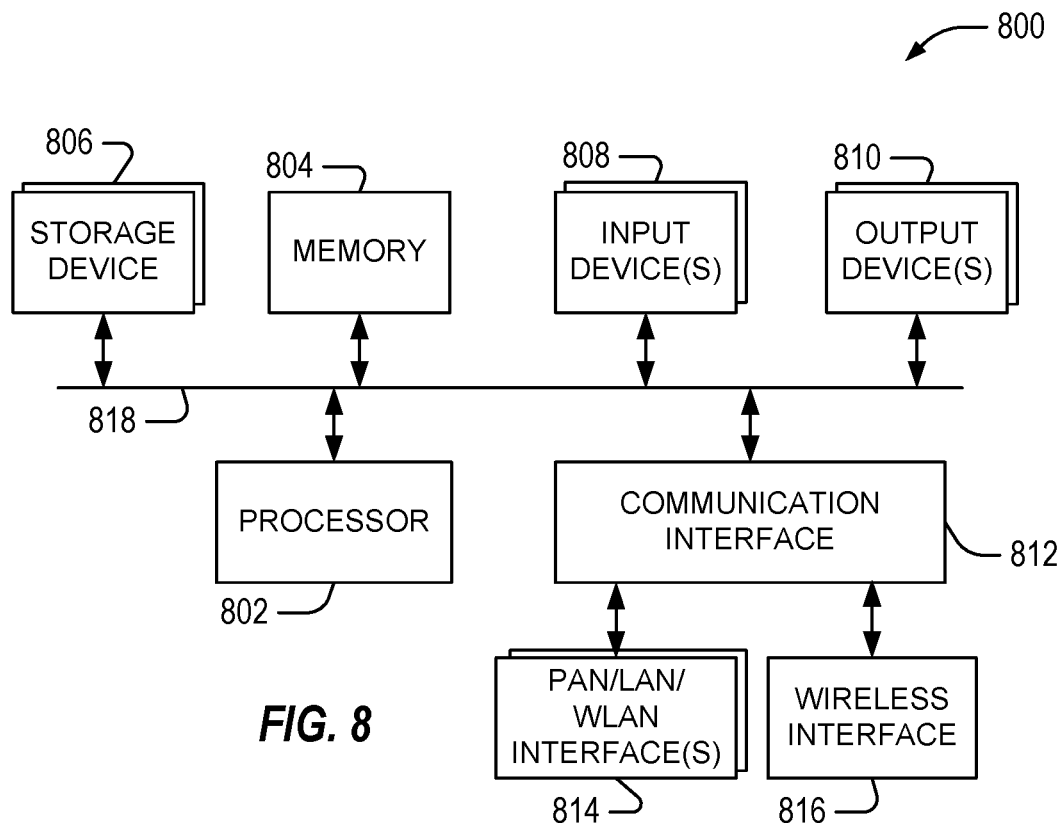
FIG. 8 is a block diagram of an example server system.

FIGS. 7A, 7B and 7C are user interface diagrams useful for describing a third example decryption scenario. As shown in FIG. 7A, the user opens the security application along with the messaging application. The user then drags and drops the encrypted package 702 along the arc 704 as indicated by the intermediate encryption packages 702' and 702". In response to dropping the encryption package 702" in the security application as shown in FIG. 7A, the security application requests authentication information 706 from the user as shown in FIG. 7B. Once the user is authenticated, the encryption package is decrypted and the clear data is displayed from the security application as shown by block 708 of FIG. 7C FIG. 8 is a block diagram of an example processing system 800 that may be used as any of the servers 110, 112 and/or 114, shown in FIG. 1. The system 800 includes a processor 802 coupled to a bus 818. Also coupled to the bus 818 are a storage device 806 (e.g. a flash memory device); a memory 804, which may include random access memory (RAM) and read only memory (ROM); one or more input devices 808 (e.g. a keyboard, a touchscreen, a microphone etc.); one or more output devices 810 (e.g. a display screen, a speaker etc.) and a communications interface 812 to provide communication between the system 800 and other systems as described above with reference to FIG. 1.

The memory 804 may store computer instructions for applications that are currently running on the system 800. The storage device 806 may be a database. In a cloud storage server, for example, the storage device 806 may hold the encrypted user files, described above.

As shown in FIG. 8 the communications interface may be coupled to a wide area network (WAN), for example, the Internet, a personal area network (PAN), a local area network (LAN), a wireless LAN (WLAN) interface such as a wired or optical Ethernet connection and/or a wireless connection (e.g. IEEE 802.11, IEEE 802.15, etc.). In addition the communications interface 812 may be coupled to a wireless interface such as a 3GPP mobile device interface. The interfaces 814 and 816 may be coupled to respective transceivers and/or modems (not shown) to implement the data communications operations.

Processor 802 may include a microprocessor, microcontroller, digital signal processor (DSP) that is configured to execute commands stored in the memory 804 corresponding to the programs (Internet browsers, application program interfaces (APIs), dynamically linked libraries (DLLs), applications (APPs), etc.) described above. The memory 804 may also store temporary variables or other information used in the execution of these programs. The programs stored in the memory 804 may be retrieved by the processor from a non-transitory machine-readable memory, for example, the storage device 806, or from other non-transitory media such as a CD-ROM, digital versatile disk (DVD), etc.

Figure 9:
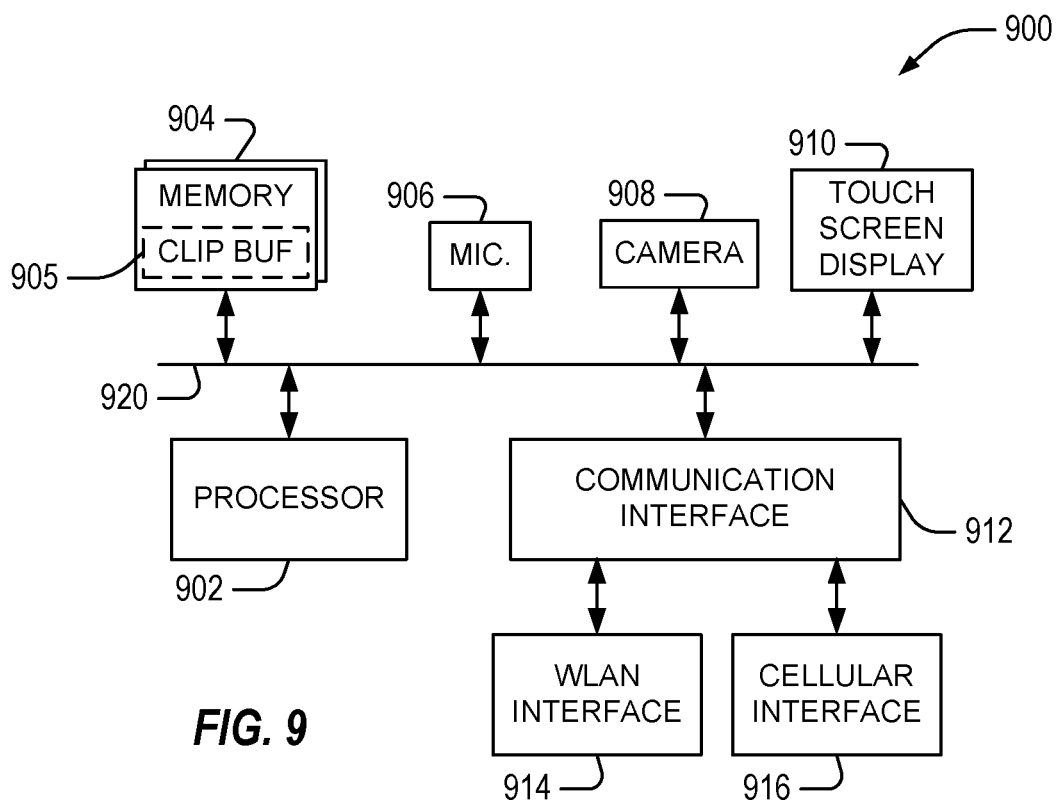
FIG. 9 is block diagram of an example mobile device.

FIG. 9 is a block diagram of an example processing system 900 that may be used as any of mobile devices 202 and 204, shown in FIG. 1. The system 900 includes a processor 902 coupled to a bus 920. Also coupled to the bus 920 are a memory 904, which may include a flash memory device, random access memory (RAM) and/or read only memory (ROM); a microphone 906, a camera 908, and an input/output device 910, such as a touch screen display. The bus 920 also connects the system 900 to a communications interface 912 to provide communication between the system 900 and the cellular wireless network 106 and/or the Wi-Fi network 116 shown in FIG. 1.

The memory 904 may store computer instructions for applications that are currently running on the system 900 and may include the clipboard buffer 905. The communications interface 912 may be coupled to a wireless LAN (WLAN) interface 914 such as a wireless connection (e.g. IEEE 902.11, IEEE 902.15, etc.). In addition the communications interface 912 may be coupled to a wireless interface such as a 3GPP mobile device interface 916. The interfaces 914 and 916 may be coupled to respective transceivers and/or modems (not shown) to implement the data communications operations.

Processor 902 may include a microprocessor, microcontroller, digital signal processor (DSP) that is configured to execute commands stored in the memory 904 corresponding to the programs (Internet browsers, application program interfaces (APIs), dynamically linked libraries (DLLs), applications (APPs), etc.) described above. The memory 904 may also store temporary variables, the clipboard, or other information used in the execution of these programs. The programs stored in the memory 904 may be retrieved by the processor from a separate physical memory, for example, a flash memory device, a CD-ROM, digital versatile disk (DVD), etc.

The aforementioned example systems have been described with respect to interaction among several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

Furthermore, while a particular feature of the claimed subject matter may have been disclosed with respect to one of several implementations, such feature may be combined with one or more other features of the other implementations as may be desired and advantageous for any given or particular application. In addition, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
one or more processors; and
one or more memories storing instructions that, upon execution by the one or more processors, configure the system to perform operations comprising:
receiving a data object;
selecting an application format that corresponds with an application from among a plurality of applications, wherein the application is to send or store an updated data object; and
generating the updated data object by performing a security function upon the data object based on at least the application format of the application.

2. The system of claim 1, wherein the security function includes a decryption function, and the performing the security function includes:
decrypting the data object based on the decryption function; and
wherein the operations further comprise causing presentation of the decrypted data object, wherein the updated data object comprises the decrypted data object.

3. The system of claim 1, wherein the security function includes an encryption function that uses an encryption key, and the performing the security function includes:
encrypting the data object based on the encryption key to generate an encrypted data object, wherein the updated data object comprises the encrypted data object; and
performing at least one of:
distributing the encrypted data object to a recipient via the application; or
storing the encrypted data object.

4. The system of claim 3, wherein the updated data object includes an expiration event that comprises an expiration date, and the operations further comprise:
detecting the expiration event;
revoking a permission of the recipient to decrypt the encrypted data object in response to the detecting the expiration event;
receiving a decryption request from the recipient; and
denying the decryption request based on the permission being revoked.

5. The system of claim 3, wherein the updated data object includes a restriction that restricts an action to be performed upon the encrypted data object, and the operations further comprise:
receiving a request to perform the action upon the encrypted data object; and
denying the request to perform the action upon the encrypted data object.

6. The system of claim 1, wherein receiving the data object includes:
causing display of a soft keyboard; and
receiving the data object as a user input via the soft keyboard.

7. The system of claim 6, wherein the soft keyboard comprises a set of soft buttons that include a first soft button, and wherein performing the security function upon the data object includes:
receiving a selection of the first soft button from among the set of soft buttons;
causing display of information about a set of recipients in response to the selection of the first soft button from among the set of soft buttons;
receiving an input that selects a recipient from among the set of recipients based on the information; and
encrypting the data object based on the recipient from among the set of recipients.

8. The system of claim 1, wherein selecting the application format that corresponds with the application includes:
receiving a user input that selects the application from among the plurality of applications.

9. The system of claim 1, wherein the data object corresponds with a first graphical icon presented within a first region of a graphical user interface, the graphical user interface comprises the first region and at least a second region, and the performing the security function upon the data object includes:
receiving a tactile input that drags the first graphical icon from the first region of the graphical user interface to the second region of the graphical user interface;
performing the security function upon the data object in response to the tactile input; and
causing display of a presentation of the updated data object upon performing the security function.

10. The system of claim 9, wherein performing the security function upon the data object further comprises:
accessing authentication information associated with a user; and performing the
security function based on the authentication information.

11. The system of claim 1, wherein the data object corresponds with a first graphical icon presented within a graphical user interface, the graphical user interface further comprises a display of an application icon that corresponds with the application at a position within the graphical user interface, and the operations further comprise:
receiving a tactile input that drags the first graphical icon from a first region of the graphical user interface to the position of the application icon within the graphical user interface; and
distributing the updated data object to a recipient via the application in response to the tactile input.

12. The system of claim 1, wherein the operations further comprise:

allocating the data object to a historical list of data objects.

13. A method comprising:

receiving a data object at a device;

selecting an application format that corresponds with an application from among a plurality of applications executed by the device;

performing a security function upon the data object based on at least the application format of the application, the security function including an encryption function; and distributing the data object to a recipient via the application.

14. The method of claim 13, wherein the data object includes an expiration event that comprises an expiration date, the recipient is associated with a permission to decrypt the data object, and the method further comprises:

detecting the expiration event;

revoking the permission to decrypt the data object from the recipient in response to the expiration event;

receiving a request to decrypt the data object from the recipient; and denying the request from the recipient based on the revoking the permission.

15. The method of claim 13, wherein the data object includes a restriction that restricts an action to be performed upon the data object, and the method further comprise:

receiving a request to perform the action upon the data object; and denying the request to perform the action upon the data object.

16. The method of claim 13, wherein receiving the data object at the device includes:

causing display of a soft keyboard at the device; and receiving the data object as a user input via the soft keyboard.

17. The method of claim 16, wherein the soft keyboard comprises a set of soft buttons that include a first soft button, and wherein performing the security function upon the data object includes:

receiving a selection of the first soft button from among the set of soft buttons;

causing display of a set of recipients at the device in response to the selection of the first soft buttons from among the set of soft buttons;

receiving an input that selects a recipient from among the set of recipients; and encrypting the data object based on the recipient from among the set of recipients.

18. The method of claim 13, wherein selecting the application format that corresponds with the application includes:

receiving a user input that selects the application from among the plurality of applications executed by the device.

19. A non-transitory machine-readable storage medium comprising instructions that, when executed by one or more processors of a device, cause the device to perform operations including:

receiving a data object at the device;

selecting an application format that corresponds with an application from among a plurality of applications executed by the device;

performing a security function upon the data object based on at least the application format of the application, the security function including a decryption function; and causing display of a presentation of the data object based on the decryption function.

20. The non-transitory machine-readable storage medium of claim 19, wherein the data object corresponds with a first graphical icon presented within a graphical user interface presented at the device, the graphical user interface further comprises a display of an application icon that corresponds with the application at a position within the graphical user interface, and the operations further comprise:

receiving a tactile input that drags the first graphical icon from a first region of the graphical user interface to the position of the application icon within the graphical user interface; and performing the security function upon the data object in response to the tactile input that drags the first graphical icon from the first region of the graphical user interface to the position of the application icon within the graphical user interface.

\* \* \* \* \*